US009086813B2

(12) United States Patent
Zeng et al.

(10) Patent No.: US 9,086,813 B2
(45) Date of Patent: Jul. 21, 2015

(54) METHOD AND APPARATUS TO SAVE AND RESTORE SYSTEM MEMORY MANAGEMENT UNIT (MMU) CONTEXTS

(71) Applicant: QUALCOMM Incorporated, San Diego, CA (US)

(72) Inventors: Thomas M. Zeng, San Diego, CA (US); Azzedine Touzni, San Diego, CA (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/834,380

(22) Filed: Mar. 15, 2013

(65) Prior Publication Data

US 2014/0282580 A1 Sep. 18, 2014

(51) Int. Cl.
*G06F 3/06* (2006.01)
*G06F 12/10* (2006.01)
*G06F 12/12* (2006.01)
*G06T 1/60* (2006.01)

(52) U.S. Cl.
CPC ............ *G06F 3/0631* (2013.01); *G06F 3/0604* (2013.01); *G06F 3/0673* (2013.01); *G06F 12/10* (2013.01); *G06F 12/12* (2013.01); *G06T 1/60* (2013.01)

(58) Field of Classification Search
CPC . G06F 9/3851; G06F 9/30123; G06F 9/3009; G06T 1/60; Y02B 60/142
USPC .......................................................... 345/531
See application file for complete search history.

(56) References Cited

U.S. PATENT DOCUMENTS 8,671,411 B2* 3/2014 Gosalia et al. ................ 718/104
2012/0023311 A1* 1/2012 Yamamoto et al. ........... 712/205

OTHER PUBLICATIONS

Author Unknown, "Apple A4," Wikipedia, Mar. 1, 2013, retrieved Sep. 30, 2014 from http://de.wikipedia.org/w/index.php?title=Apple A4&oldid=114812971, 4 pages.
Author Unknown, "Cortex-A8 Technical Reference Manual," Revision: r3p1, ARM Limited, 2006-2010, http://infocenter.arm.com/help/index.jsp?topic=/com.arm.doc.ddi0344k/index.html, 762 pages.
International Search Report and Written Opinion for PCT/US2014/024083, mailed Oct. 17, 2014, 11 pages.
Second Written Opinion for PCT/US2014/024083, mailed Mar. 23, 2015, 7 pages.

* cited by examiner

*Primary Examiner* — Hau Nguyen
(74) *Attorney, Agent, or Firm* — Withrow & Terranova, PLLC

(57) ABSTRACT

A wireless mobile device includes a graphic processing unit (GPU) that has a system memory management unit (MMU) for saving and restoring system MMU translation contexts. The system MMU is coupled to a memory and the GPU. The system MMU includes a set of hardware resources. The hardware resources may be context banks, with each of the context banks having a set of hardware registers. The system MMU also includes a hardware controller that is configured to restore a hardware resource associated with an access stream of content issued by an execution thread of the GPU. The associated hardware resource may be restored from the memory into a physical hardware resource when the hardware resource associated with the access stream of content is not stored within one of the hardware resources.

21 Claims, 6 Drawing Sheets

METHOD AND APPARATUS TO SAVE AND RESTORE SYSTEM MEMORY MANAGEMENT UNIT (MMU) CONTEXTS

BACKGROUND

1. Field

The present disclosure generally relates to integrated circuit design. More specifically, the present disclosure relates to saving and restoring system memory management unit (MMU) translation contexts.

2. Background

One of the features driving performance of single-user computers is computer graphics. Supporting high performance computer graphics is not only significant in computer games and workstations, but is also significant across the personal computer market. Memory specifications for supporting high performance computer graphics may become a bottle neck to improved performance.

One technique for improving or even optimizing performance in graphic devices is the use of virtual and physical address spaces. A virtual address space allows applications to use as much memory as desired, without regard to the memory utilization of other applications. The application retrieves and stores instructions and data using virtual addresses, and the memory system retrieves and stores instructions and data in physical memory using physical addresses to improve, or even optimize performance. Accordingly, translation between virtual memory space addressing and physical memory space addressing is performed by the computing system. As a result, applications and data may be moved within memory and between different types of memory without having to recode applications.

Another technique for meeting the memory specifications of high performance computer graphics applications is the use of virtual machines. A virtual machine (VM) is a software implementation of a machine (i.e., a computer) that executes programs like a physical machine. Virtual machines may be based on specifications of a computer architecture and functions of a real world computer to provide a virtual environment, including virtual memory. As technology evolves, virtual memory (in respect to virtualization) will use memory over-commitment to manage the memory sharing between multiple virtual machines on one physical computer. For example, memory over-commitment may provide a virtual address space that is larger than the available physical address space.

Techniques such as virtual memory and virtual machines may not be supported by wireless mobile devices. As described herein, wireless mobile devices include, but are not limited to, mobile phones, hand-held personal communication systems (PCS) units, portable data units such as personal data assistants, GPS enabled devices, navigation devices, set top boxes, music players, video players, entertainment units, fixed location data units such as meter reading equipment, or any other battery powered device that stores or retrieves data or computer instructions, or any combination thereof.

SUMMARY

According to one aspect of the present disclosure, a wireless mobile device includes a graphic processing unit (GPU), a memory and a system MMU coupled to a memory and the GPU. The system MMU includes a plurality of hardware resources. The system MMU also includes a hardware controller that is configured to restore a hardware resource associated with an access stream of content issued by an execution thread of the GPU. The associated hardware resource may be restored from the memory into a physical hardware resource of the plurality of hardware resources when the hardware resource associated with the access stream of content is not stored within one of the plurality of hardware resources.

According to another aspect of the present disclosure, a method for hardware assisted context bank restoration within a system memory management unit (MMU) is described. The method includes evicting a selected one of a plurality of physical hardware resources when a hardware resource associated with an access stream of content issued by an execution thread of a graphic processing unit (GPU) is not stored within one of the plurality of physical hardware resources. The method also includes restoring the hardware resource associated with the access stream of content from a memory into the selected one of the plurality of physical hardware resources.

According to one aspect of the present disclosure, a wireless mobile device includes a graphic processing unit (GPU), a memory and a system memory management unit (MMU) coupled to the memory and the GPU. The system MMU includes a plurality of hardware resources. The system MMU also includes means for restoring a hardware resource associated with an access stream of content issued by an execution thread of the GPU. The associated hardware resource may be restored from the memory into a physical hardware resource of the plurality of hardware resources when the hardware resource associated with the access stream of content is not stored within one of the plurality of hardware resources.

According to an additional aspect of the present disclosure, a computer program product for a wireless mobile device is described. The computer program product includes a non-transitory computer-readable medium having program code recorded thereon. The program code includes program code to evict a selected one of a plurality of physical hardware resources when a hardware resource associated with an access stream of content issued by an execution thread of a graphic processing unit (GPU) is not stored within one of the plurality of physical hardware resources. The program code also includes program code to restore the hardware resource associated with the access stream of content from a memory into the selected one of the plurality of physical hardware resources.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
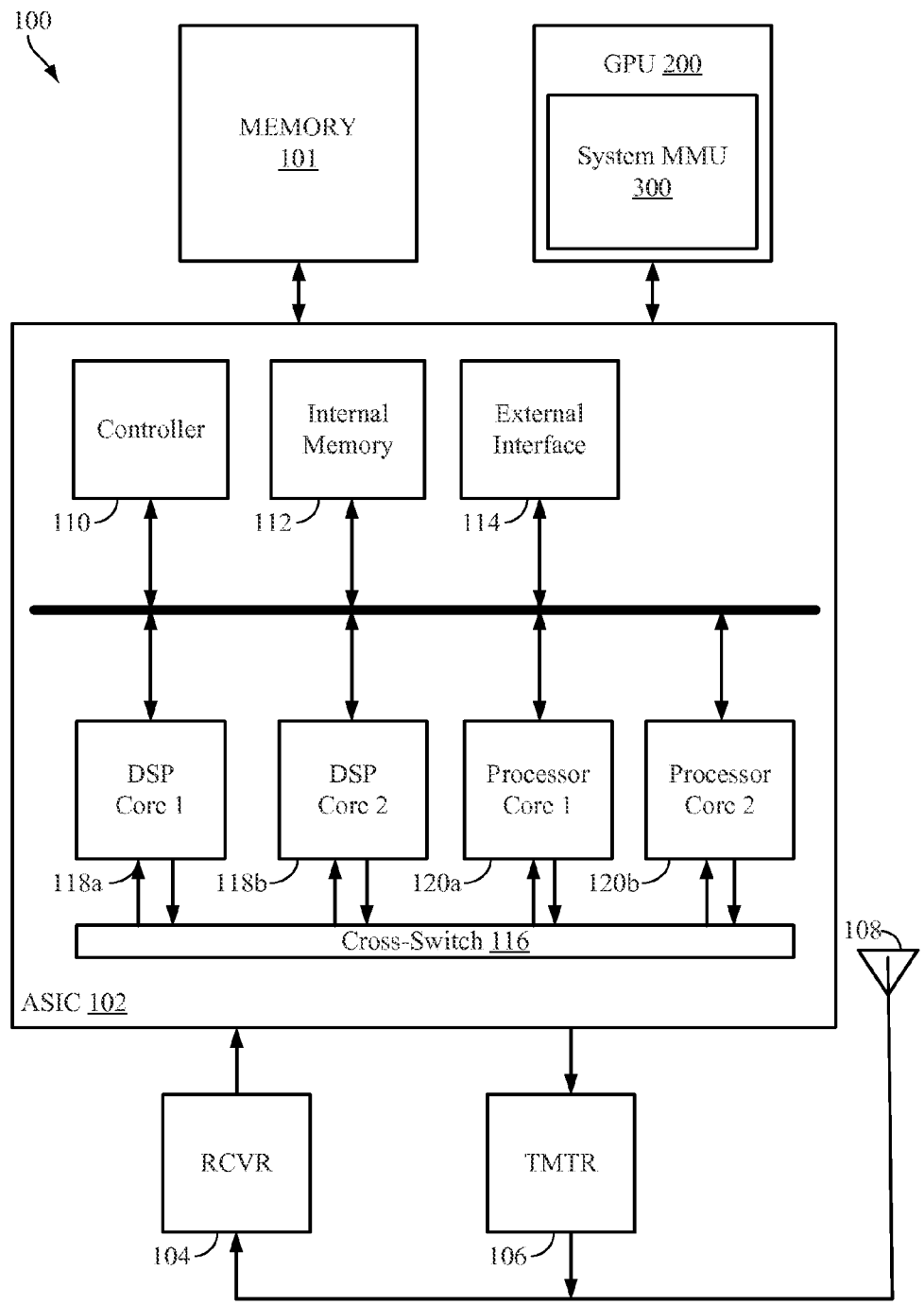
FIG. 1 is a block diagram of a wireless mobile device that includes a multi-processor system having a graphics processing unit (GPU), according to one aspect of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The development of graphics based user-friendly application programs and operating systems has dramatically increased the use of graphics in computers. Specialized graphics processing units (GPUs) have been developed by computer component manufacturers to offload some of the intense graphics computing demands from the central processing unit (CPU) to these specialized GPUs. Conventional computing systems may implement these GPUs as peripheral devices. For example, a GPU may be implemented on a Peripheral Component Interconnect (PCI) compatible card that includes local graphics memory (also referred to herein as video memory) on the card itself. This local video memory enables the GPU to process graphics more quickly.

During operation of a GPU, a current state and context of the GPU is stored by a disjoint set of internal registers, Z buffer contexts, frame buffer contents, and texture map storage buffers. One or more GPUs may be shared among multiple applications by performing context switching. That is, efficient sharing of a GPU involves effectively switching between different GPU contexts, which can be challenging. Context switching within a single operating system image involves a number of serial steps orchestrated by software (e.g., the operating system). The GPU autonomously saves and restores the internal state and notifies the operating system when the operation is complete.

Address translation during GPU operation may be performed to provide client requestors with access to their respective current state and GPU context. The GPU may include a system memory management unit (MMU) that provides address translation. In particular, the system MMU may provide an address translation function on behalf of multiple client requestors. As described herein, client requestors may be independent execution threads that issue access streams of content that are stored within physical context banks of the system MMU. As described herein, access streams of content include memory access requests issued by client requestors, and each access stream of content is associated with a stream identification (ID) that is unique to the access stream of content. For example, the client requestors may be multiple dual context client requestors in the GPU (e.g., web browser instances (i.e., tabs), games, etc.). The client requestors are each capable of presenting requests to the system MMU on the behalf of one or more streams of context. Each stream may be associated with a stream ID that is unique to the stream.

The system MMU includes a number of physical instances of context banks, in which each physical context bank includes multiple hardware registers. The system MMU context banks may each include the state for governing the address translation function for requests that target that bank. In addition, the total number of the physical instances of the context banks may be less than the total number of stream IDs in use across all of the client requestors associated with the system MMU. Software intervention may occur when the number of client requestors exceeds the number of available physical context banks within the system MMU. Conventionally, software is used to evict a physical context bank for the access stream of a current execution thread (e.g., a client requestor).

In one aspect of the present disclosure, hardware resources are used to save and restore the physical context banks to provide available context banks for the active execution threads without software intervention. For example, the system MMU may automatically save the content of a physical context bank to a region of memory, and read a set of new content into the physical context bank from a second region of memory. In this configuration, the save and restore operation of the system MMU translation context is performed in response to receiving a request from a client requestor indicating a stream ID that is not currently affiliated with one of the physical context banks (e.g., an inactive stream of content). In response, the system MMU performs a context bank state save/restore operation without intervention from software.

FIG. 1 shows a block diagram of a wireless mobile device 100 that includes a multi-processor system having a graphics processing unit (GPU) 200 according to one aspect of the disclosure. The wireless mobile device 100 may monitor and/or communicate with one or more wireless communication systems. On the receive path, an antenna 108 receives signals transmitted by base stations and/or satellites and provides a received signal to a receiver (RCVR) 104. The receiver 104 processes (e.g., filters, amplifies, frequency downconverts, and digitizes) the received signal and provides samples to an application specific integrated circuit (ASIC) 102 for further processing. On the transmit path, the ASIC 102 processes data to be transmitted and provides data to a transmitter (TMTR) 106. The transmitter 106 processes (e.g., converts to analog, filters, amplifies, and frequency upconverts) the data and generates a modulated signal, which is transmitted via the antenna 108.

The ASIC 102 includes various processing units that support multi-threaded graphics operation. For the configuration shown in FIG. 1, the ASIC 102 includes digital signal processor (DSP) cores 118A and 118B, processor cores 120A and 120B, a cross-switch 116, a controller 110, an internal memory 112, and an external interface unit 114. The DSP cores 118A and 118B, and the processor cores 120A and 120B support various functions such as video, audio, graphics, gaming, and the like. Each processor core may be a RISC (reduced instruction set computing) machine, a microprocessor, or some other type of processor.

In this configuration, the controller 110 controls the operation of the processing units within the ASIC 102. The internal memory 112 stores data and program codes used by the processing units within the ASIC 102. The external interface unit 114 interfaces with other units external to the ASIC 102. In general, the ASIC 102 may include fewer, more and/or different processing units than those shown in FIG. 1. The number of processing units and the types of processing units included in the ASIC 102 are dependent on various factors such as the communication systems, applications, and functions supported by the multi-processor system of the wireless mobile device 100. Although not shown, the wireless mobile device 100 is battery powered.

The multi-threaded graphics operation may be implemented in various ways. For example, these techniques may be implemented in hardware, firmware, software, or a combination thereof. For a hardware implementation, the texture coding techniques may be implemented within one or more ASICs, DSPs, PLDs, FPGAs, processors, controllers, microcontrollers, microprocessors, electronic devices, other electronic units designed to perform the functions described herein, or a combination thereof. Certain aspects of the multi-threaded graphics operation may be implemented with software modules (e.g., procedures, functions, and so on) that perform the functions described. The software codes may be stored in a memory (e.g., a memory 101 and/or the internal memory 112 in FIG. 1) and executed by a processor (e.g., DSP cores 118A and/or 118B). The memory may be implemented within the processor or external to the processor.

The ASIC 102 further couples to the memory 101 that stores multi-threaded graphics instructions. For the configuration shown in FIG. 1, each processing core may execute the instructions. In this configuration, the ASIC 102 includes a graphics processing unit (GPU) 200 that includes a system memory management unit (MMU) 300, as further illustrated in FIGS. 2 and 3.

Figure 2:
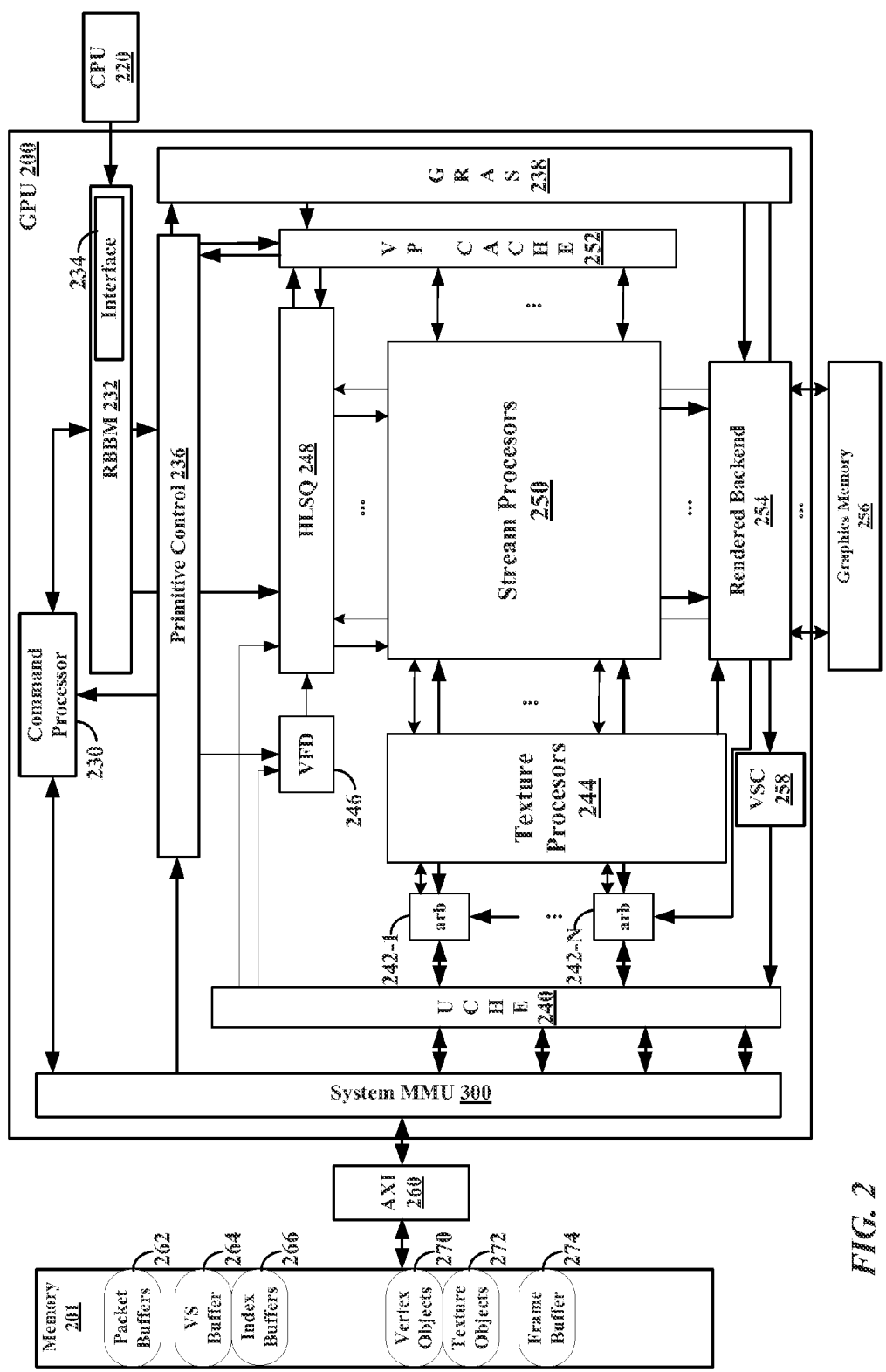
FIG. 2 is a block diagram further illustrating the graphics processing unit (GPU) of FIG. 1, according to a further aspect of the disclosure.

FIG. 2 is a block diagram illustrating the GPU 200 of FIG. 1 according to one aspect of the disclosure. A top level hardware block of the GPU 200 includes a command processor 230 and a register backbone manager (RBBM) 232. The command processor 230 schedules GPU commands from the system MMU 300, and the RBBM 232 provides an interface 234 to a central processing unit 220. A primitive control (PC) 236 is the first block in the graphics pipeline and is communicably coupled to a graphics rasterizer (GRAS) 238 and a vertex parameter cache 252. The primitive control 236 receives draw commands from the command processor 230 through the RBBM 232.

The graphics pipeline of the GPU 200 also includes a vertex fetcher-decoder (VFD) 246 that provides decoded vertices to a high level sequencer queue (HLSQ) 248. Stream processors 250 are coupled to texture processors 244, HLSQ 248, vertex parameter cache 252, and rendered backend 254 as part of the graphics pipeline. Arbitrators 242 (242-1, . . . , 244-N) control access to a unified cache (UCHE) 240. The graphics pipeline of the GPU 200 also includes a visibility stream composer (VSC) 258 that is coupled between the graphics rasterizer 238 and the unified cache 240. The GPU 200 also includes a graphics memory 256 as well as an external memory 201 that is coupled to the GPU 200 through an advance extensible interface (AXI) bus 260. The external memory 201 may include packet buffers 262, a visibility stream buffer 264, index buffers 266, vertex objects 270, texture objects 272, and a frame buffer 274.

In this configuration, the system MMU 300 sits between the AXI bus 260 and the unified cache 240, the command processor 230, and the primitive control 236. The system MMU 300 is further illustrated in FIG. 3.

Figure 3:
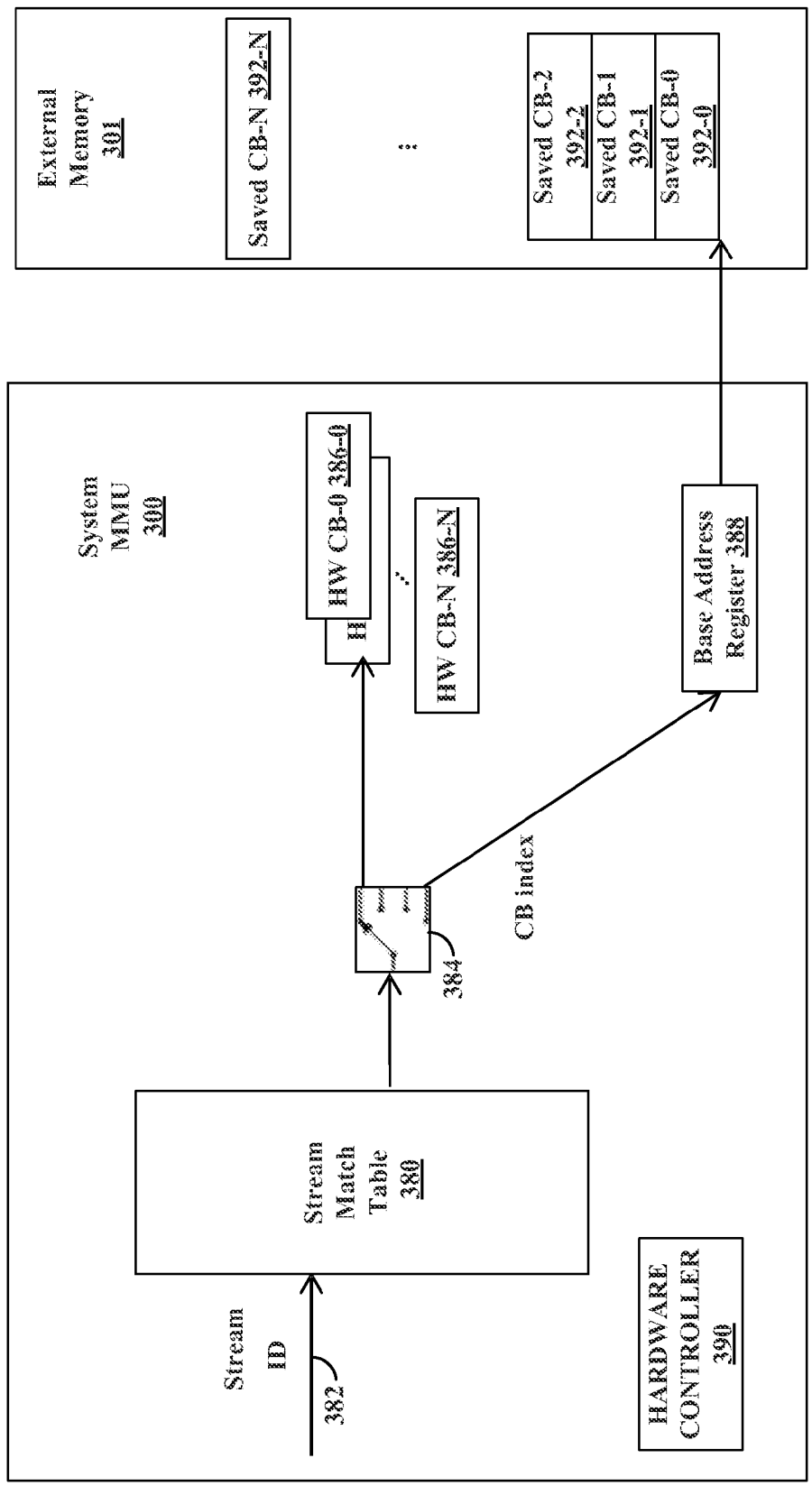
FIG. 3 is a block diagram further illustrating a system memory management unit (MMU) of FIG. 2, according to a further aspect of the disclosure.

FIG. 3 is a block diagram further illustrating the system MMU 300 of FIG. 2, according to a further aspect of the disclosure. In this configuration, the system MMU 300 includes a number of hardware resources, for example hardware context banks 386 (386-0, . . . , 386-N), in which each hardware context bank includes a set of hardware registers (not shown). The hardware context banks 386 of the system MMU 300 may each include the state for governing the address translation function for requests that target that bank. The total number of hardware context banks 386, however, may be less than the total number of streams IDs in use across all of the client requestors associated with the system MMU.

Software intervention may occur when the number of client requestors exceeds the number of available physical context banks within the system MMU. In current ARM (advanced RISC (reduced instruction set computing) machine) technology, the HLOS (high level output specification) may specify as many as two hundred (200) or more GPU applications. A sufficient number of physical context banks may not be provisioned to meet this use case because the current system MMU standard only supports up to one-hundred twenty-eight (128) physical context banks.

During GPU operation, the HLOS specifies the switch to a new GPU application by using a software driver to issue GPU instructions to self-program a system MMU context bank to match the new process. That is, GPU software instructions are issued to evict a physical context bank for the access stream of a current execution thread (e.g., a client requestor). For example, GPU commands may be issued to synchronize physical context bank creation at the end of a previous set of GPU operations. A GPU driver may issue a series of GPU commands to create a new context bank during an ASID (address space identifier) switch.

The conventional use of GPU instructions to create a system MMU context bank on the fly, however, is problematic. In particular, creating a system MMU context bank on the fly increases a GPU context switch time. For example, the GPU context switch time may be increased by as much as the time it takes for the GPU to update fourteen (14) registers in the system MMU configuration space. In addition, creating a system MMU context bank on the fly complicates the GPU programming model and causes timing issues for switching between GPU contexts.

Creating physical context banks on the fly could be avoided if physical context banks to accommodate all GPU contexts were available. However, there may be up to two-hundred fifty-six (256) GPU context on a wireless mobile device. Provisioning a wireless mobile device with 256 physical context banks is not cost effective. In addition, the current system MMU specification has a limit of one-hundred twenty-eight (128) physical context banks.

In one aspect of the present disclosure, hardware resources are used to save and restore the physical context banks to provide available context banks for the active execution threads without software intervention. As shown in FIG. 3, a hardware controller 390 of the system MMU 300 may automatically save the content of a hardware context bank 386 to a region of an external memory 301 (e.g., a dynamic random access memory (DRAM)). Once saved, the hardware controller 390 reads a set of new content into a hardware context bank from a saved context bank 392 (392-0, . . . , 392-N) within the external memory 301. In this configuration, the save and restore operation of the system MMU translation context is performed in response to receiving a request from a client requestor indicating a stream ID 382 which is not currently affiliated with one of the hardware context banks 386. In response, the hardware controller 390 of the system MMU 300 performs a context bank state save/restore operation without intervention from software, for example, as described in FIG. 4.

Figure 4:
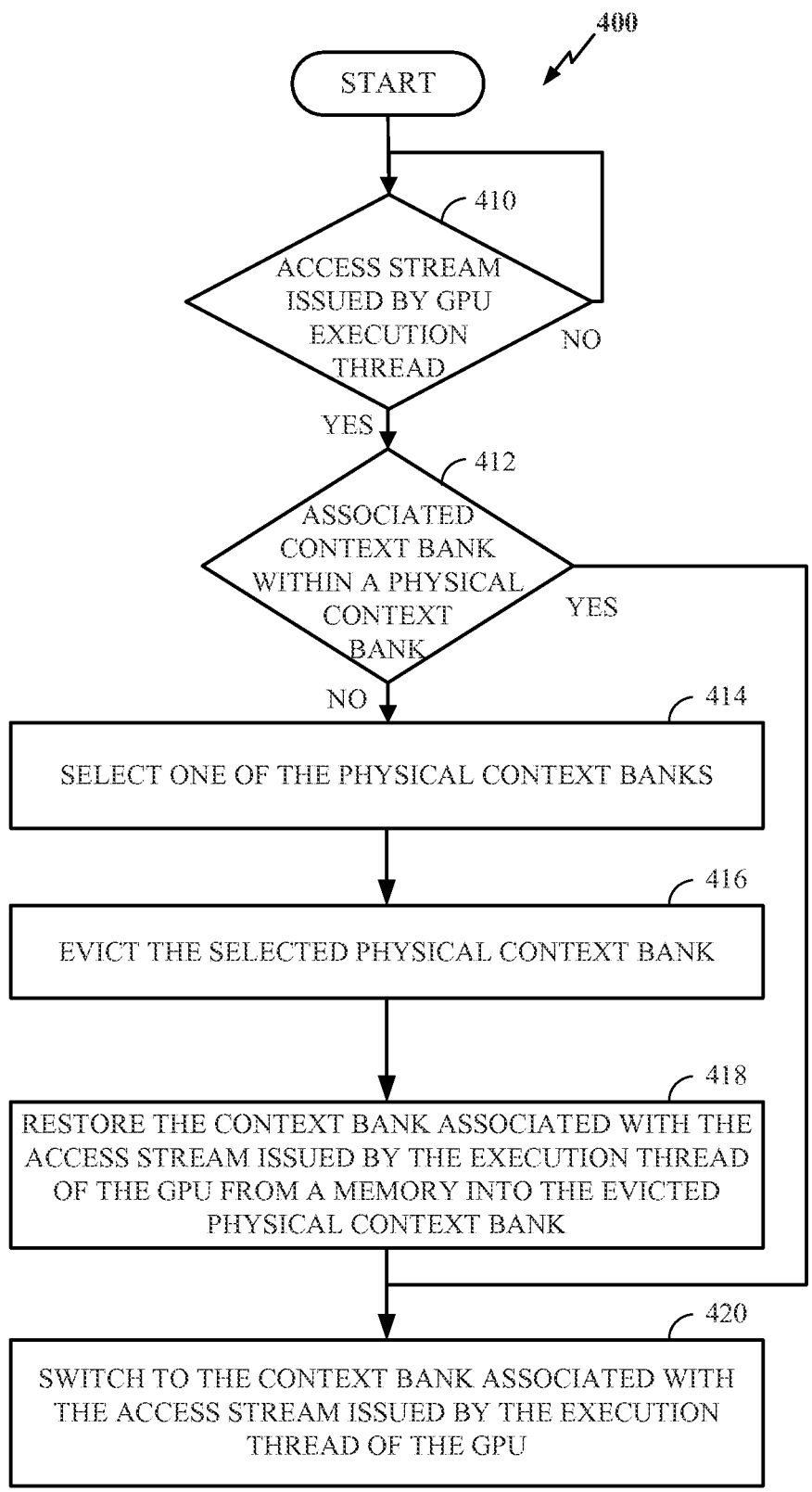
FIG. 4 is a process flow diagram showing a method for saving and restoring system memory management unit (MMU) contexts according to an illustrative aspect of the present disclosure.

FIG. 4 is a process flow diagram showing a method 400 for saving and restoring system MMU translation contexts according to an illustrative aspect of the present disclosure. At block 410, it is determined whether an access stream of content is issued by an execution thread of a graphic processing unit (GPU). When as issued access stream of content is detected, it is determined whether the context bank associated with the issued access stream of content is stored within one of a set of hardware context banks at block 412.

For example, as shown in FIG. 3, the hardware controller 390 of the system MMU 300 may detect an access stream issued by a dual context client requestors in a GPU (e.g., web browser instances (tabs), games, etc.). The hardware controller 390 may access a stream match table 380 using a stream identification (ID) 382 associated with the issued access stream of content. Using the stream ID 382 and the stream match table 380, the hardware controller 390 determines whether a context bank associated with the issued access stream of content is stored within one of the hardware context banks 386.

Referring again to FIG. 4, block 414 is performed when the context bank associated with the access stream of content is not stored within a physical context bank. At block 414, one of the physical context banks is selected. For example, as shown in FIG. 3, the hardware controller 390 may select the one of the hardware context banks 386 that is associated with an inactive access stream of content. When each of the hardware context banks 386 is associated with an active access stream of content, the hardware controller may block the access stream issued by the client requestor (e.g., an execution thread of a GPU).

At block 416, an information state of the selected physical context bank is evicted to an external memory. At block 418, the context bank associated with the access stream issued by the execution thread of the GPU is restored from the external memory into the evicted physical context bank. At block 420, a switch is performed to the context bank associated with the access stream issued by the execution thread of the GPU. In this configuration, process blocks 414 to 418 are skipped when an information state of a target context bank is stored within a physical context bank. The operation to perform the context bank switch to the target context bank at block 420 may be performed in a single clock cycle.

For example, as shown in FIG. 3, the hardware controller 390 stores an information state of the selected hardware context bank 386 within a saved context bank 392 of the external memory 301 according to a saved context bank base address register 388. This occurs when the stream match table 380 points to a saved context bank 392-1 ... 392-N in the external memory 301. Once saved, the information state of the saved context bank 392 identified by the stream match table 380 is restored to the evicted hardware context bank 386. For example, the hardware control may perform a write back of the information state for the saved context bank 392 to the evicted hardware context bank 386. Once restored, the hardware controller 390 may update the switch 384 to activate the evicted hardware context bank 386.

According to a further aspect of the present disclosure, a wireless mobile device including a graphic processing unit (GPU) has a system memory management unit (MMU) for saving and restoring system MMU translation contexts. The wireless mobile device includes the system MMU that is coupled to a memory and the GPU. The system MMU includes a set of hardware resources. The set of hardware resources my be a set of hardware context banks, with each of the hardware context banks having a set registers. The system MMU also includes a means for restoring a hardware resource associated with an access stream of content issued by an execution thread of the GPU. The associated hardware resource may be restored from the memory into a physical hardware resource when the hardware resource associated with the access stream of content is not stored within one of the set of hardware resources. The restoring means may be the hardware controller 390 of the system MMU 300. In another aspect, the aforementioned means may be any module or any apparatus configured to perform the functions recited by the aforementioned means.

Figure 5:
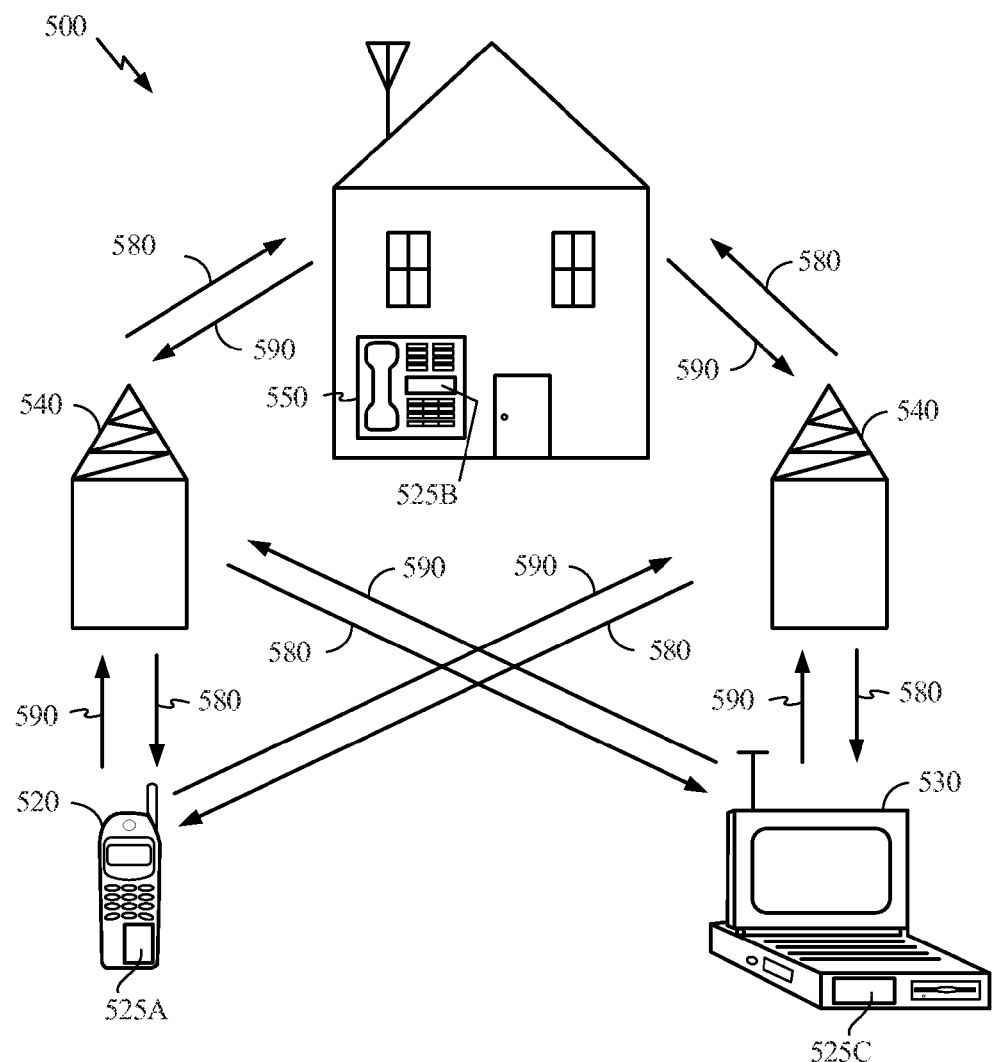
FIG. 5 is a block diagram showing an exemplary wireless communication system in which an aspect of the disclosure may be advantageously employed.

FIG. 5 is a block diagram showing an exemplary wireless communication system 500 in which an aspect of the disclosure may be advantageously employed. For purposes of illustration, FIG. 5 shows three remote units 520, 530, and 550 and two base stations 540. It will be recognized that wireless communication systems may have many more remote units and base stations. Remote units 520, 530, and 550 include IC devices 525A, 525C and 525B, which include the disclosed system MMU circuitry. It will be recognized that any device containing an IC may also include the disclosed system MMU circuitry, including the base stations, switching devices, and network equipment. FIG. 5 shows forward link signals 580 from the two base stations 540 to the remote units 520, 530, and 550 and reverse link signals 590 from the remote units 520, 530, and 550 to the two base stations 540.

In FIG. 5, one of the remote units 520 is shown as a mobile telephone, one of the remote units 530 is shown as a portable computer, and one of the remote units 550 is shown as a fixed location remote unit in a wireless local loop system. For example, the remote units may be mobile phones, hand-held personal communication systems (PCS) units, portable data units such as personal data assistants, GPS enabled devices, navigation devices, set top boxes, music players, video players, entertainment units, fixed location data units such as meter reading equipment, or any other device that stores or retrieves data or computer instructions, or any combination thereof. Although FIG. 5 illustrates remote units according to the teachings of the disclosure, the disclosure is not limited to these exemplary illustrated units. Aspects of the disclosure may be suitably employed in any device that includes a system MMU.

Figure 6:
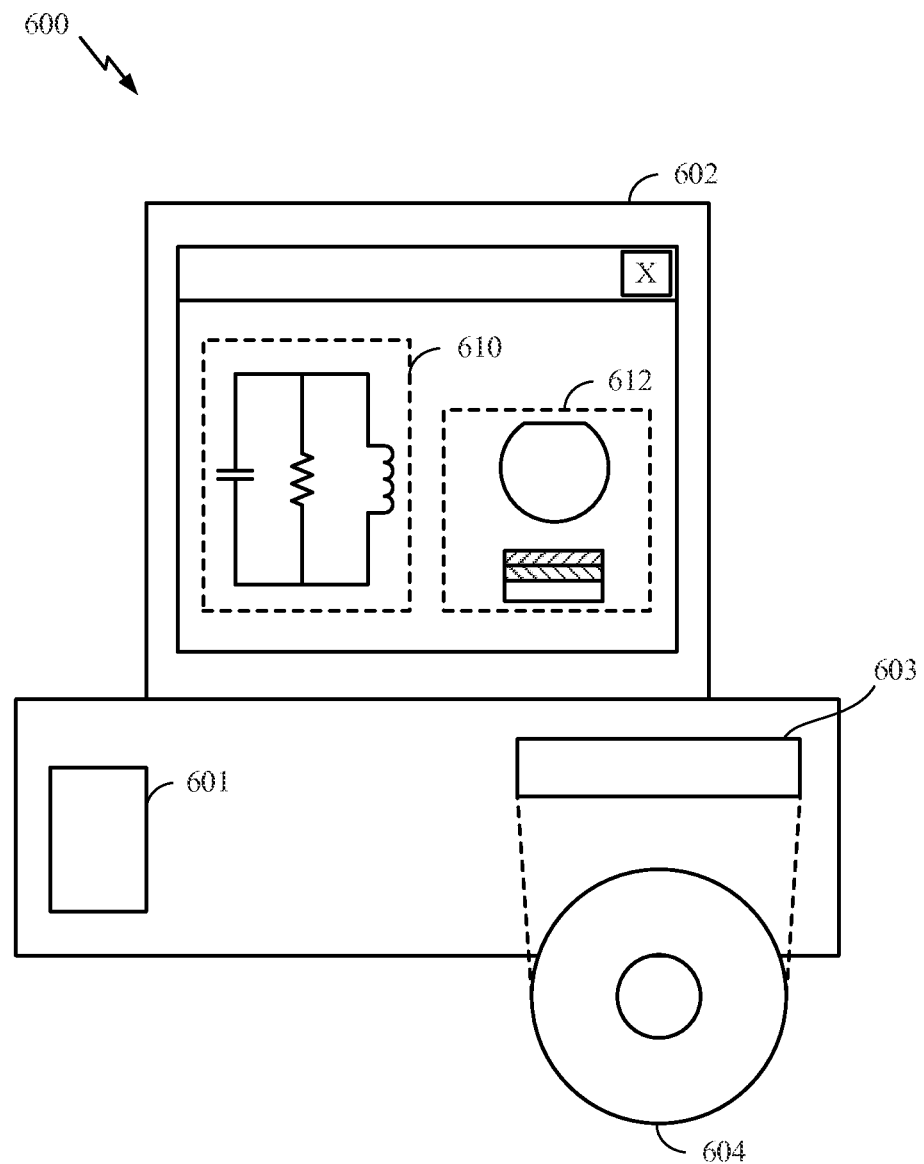
FIG. 6 is a block diagram illustrating a design workstation used for circuit, layout, and logic design of a semiconductor component according to an aspect of the present disclosure.

FIG. 6 is a block diagram illustrating a design workstation used for circuit, layout, and logic design of a semiconductor component, such as a system MMU circuitry as disclosed above. A design workstation 600 includes a hard disk 601 containing operating system software, support files, and design software such as Cadence or OrCAD. The design workstation 600 also includes a display to facilitate a circuit design 610 or a semiconductor component 612 such as a packaged integrated circuit having system MMU circuitry. A storage medium 604 is provided for tangibly storing the circuit design 610 or the semiconductor component 612. The circuit design 610 or the semiconductor component 612 may be stored on the storage medium 604 in a file format such as GDSII or GERBER. The storage medium 604 may be a CD-ROM, DVD, hard disk, flash memory, or other appropriate device. Furthermore, the design workstation 600 includes a drive apparatus 603 for accepting input from or writing output to the storage medium 604.

Data recorded on the storage medium 601 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit design 610 or the semiconductor component 612 by decreasing the number of processes for designing semiconductor wafers.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although specific circuitry has been set forth, it be appreciated by those skilled in the art that not all of the disclosed circuitry is required to practice the disclosure. Moreover, certain well known circuits have not been described, to maintain focus on the disclosure.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A wireless mobile device, comprising:
   a graphic processing unit (GPU);
   a memory; and
   a system memory management unit (MMU) coupled to the memory and the GPU, the system MMU comprising:
      a plurality of physical context banks; and
      a hardware controller configured to, independent of software instructions, restore a GPU context associated with an access stream of content issued by an execution thread of the GPU from the memory into a physical context bank of the plurality of physical context banks when the GPU context associated with the access stream of content is not stored within one of the plurality of physical context banks.

2. The wireless mobile device of claim 1, in which the plurality of physical context banks comprises physical context banks including a plurality of registers.

3. The wireless mobile device of claim 1, in which the hardware controller is further configured to:
   lookup, within a stream match table of the system MMU, a stream identification of the access stream of content issued by the execution thread of the GPU to determine whether the GPU context associated with the access stream of content is stored within one of the plurality of physical context banks.

4. The wireless mobile device of claim 1, in which the hardware controller is further configured to translate the access stream of content issued by the execution thread.

5. The wireless mobile device of claim 1, in which the hardware controller is further configured:
   to evict a content of a selected one of the plurality of physical context banks when the GPU context associated with the access stream of content is not stored within one of the plurality of physical context banks; and
   to store the content of the selected one of the plurality of physical context banks into the memory according to a base address register of the system MMU.

6. The wireless mobile device of claim 5, in which the hardware controller is further configured to block the access stream of content issued by the execution thread of the GPU when each of the plurality of physical context banks is associated with an active access stream of content.

7. The wireless mobile device of claim 1, in which the access stream of content issued by the execution thread of the GPU comprises a memory access request.

8. The wireless mobile device of claim 1, in which the hardware controller is further configured to select one of the plurality of physical context banks that is associated with an inactive access stream of content.

9. The wireless mobile device of claim 1, in which the hardware controller is further configured to update a switch to activate the physical context bank.

10. The wireless mobile device of claim 1, integrated into a mobile phone, a set top box, a music player, a video player, an entertainment unit, a navigation device, a computer, a hand-held personal communication systems (PCS) unit, a portable data unit, and/or a fixed location data unit.

11. The wireless mobile device of claim 1, in which a representation of the wireless mobile device is stored in a non-transitory computer-readable medium.

12. A method of hardware assisted context bank restoration within a system memory management unit (MMU), comprising:

evicting, by a system MMU independent of software instructions, a content of a selected one of a plurality of physical context banks when a graphic processing unit (GPU) context associated with an access stream of content issued by an execution thread of a GPU is not stored within one of the plurality of physical context banks; and restoring the GPU context associated with the access stream of content from a memory into the selected one of the plurality of physical context banks.

13. The method of claim 12, further comprising storing the content of the selected one of the plurality of physical context banks into the memory according to a base address register of the system MMU.

14. The method of claim 12, further comprising looking-up, within a stream match table of the system MMU, a stream identification of the access stream of content issued by the execution thread of the GPU to determine whether the GPU context associated with the access stream of content is stored within the one of the plurality of physical context banks.

15. The method of claim 12, further comprising translating the access stream of content issued by the execution thread.

16. The method of claim 12, further comprising:
selecting one of the plurality of physical context banks that is associated with an inactive access stream of content; and
storing a content of the selected one of the plurality of physical context banks into the memory according to a base address register of the system MMU.

17. The method of claim 12, in which the access stream of content issued by the execution thread of the GPU comprises a memory access request.

18. A wireless mobile device, comprising:
a graphic processing unit (GPU);
a memory; and
a system memory management unit (MMU) coupled to the memory and the GPU, the system MMU comprising:
a plurality of physical context banks; and
means for restoring, independent of software instructions, a GPU context associated with an access stream of content issued by an execution thread of the GPU from the memory into a physical context bank of the plurality of physical context banks when the GPU context associated with the access stream of content is not stored within one of the plurality of physical context banks.

19. The wireless mobile device of claim 18, further comprising:
means for selecting one of the plurality of physical context banks that is associated with an inactive access stream of content; and
means for storing a content of the selected one of the plurality of physical context banks into the memory according to a base address register of the system MMU.

20. The wireless mobile device of claim 18, integrated into a mobile phone, a set top box, a music player, a video player, an entertainment unit, a navigation device, a computer, a hand-held personal communication systems (PCS) unit, a portable data unit, and/or a fixed location data unit.

21. A computer program product for a wireless mobile device, the computer program product comprising:
a non-transitory computer-readable medium having program code recorded thereon, the program code comprising:
program code to evict, independent of software instructions, a content of a selected one of a plurality of physical context banks when a graphic processing unit (GPU) context associated with an access stream of content issued by an execution thread of a GPU is not stored within one of the plurality of physical context banks; and
program code to restore the GPU context associated with the access stream of content from a memory into the selected one of the plurality of physical context banks.

* * * * *

UNITED STATES PATENT AND TRADEMARK OFFICE
CERTIFICATE OF CORRECTION

PATENT NO.       : 9,086,813 B2
APPLICATION NO.  : 13/834380
DATED            : July 21, 2015
INVENTOR(S)      : Thomas M. Zeng et al.

Page 1 of 1

It is certified that error appears in the above-identified patent and that said Letters Patent is hereby corrected as shown below:

In the Claims
Claim 5, at column 10, line 41, change "base address register" to --hardware resource base address register--.
Claim 13, at column 11, line 12, change "base address register" to --hardware resources base address register--.
Claim 16, at column 11, line 28, change "base address register" to --hardware resources base address register--.
Claim 19, at column 12, line 16, change "base address register" to --hardware resources base address register--.

Signed and Sealed this
Nineteenth Day of July, 2016

Michelle K. Lee
*Director of the United States Patent and Trademark Office*